US011632523B2

(12) United States Patent
Berkeley

(10) Patent No.: US 11,632,523 B2
(45) Date of Patent: *Apr. 18, 2023

(54) HIGH SECURITY TWO-WAY VIRTUAL CROSS-BARRIER OBSERVATION AND COMMUNICATION DEVICE

(71) Applicant: Robert Berkeley, Yucaipa, CA (US)

(72) Inventor: Robert Berkeley, Yucaipa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,425

(22) Filed: Jan. 10, 2022

(65) Prior Publication Data

US 2022/0132073 A1    Apr. 28, 2022

Related U.S. Application Data

(63) Continuation-in-part of application No. 16/827,703, filed on Mar. 23, 2020, now Pat. No. 11,223,801.

(Continued)

(51) Int. Cl.
| | |
|---|---|
| *H04N 7/18* | (2006.01) |
| *H04N 5/225* | (2006.01) |
| *G07C 9/00* | (2020.01) |
| *E06B 5/16* | (2006.01) |
| *E06B 5/00* | (2006.01) |

(Continued)

(52) U.S. Cl.
CPC ............... *H04N 7/181* (2013.01); *E06B 5/00* (2013.01); *E06B 5/16* (2013.01); *G07C 9/00182* (2013.01); *H04N 5/2257* (2013.01); *E06B 1/14* (2013.01); *E06B 1/18* (2013.01); *E06B 1/52* (2013.01); *F41H 13/0012* (2013.01); *G03B 15/02* (2013.01); *G07C 2009/0019* (2013.01); *G08B 13/1436* (2013.01)

(58) Field of Classification Search
CPC ....... H04N 7/181; H04N 5/2253; H04W 4/90; H04R 1/02
See application file for complete search history.

(56) References Cited

U.S. PATENT DOCUMENTS

| | | |
|---|---|---|
| 5,548,164 A | 8/1996 | Hillard |
| 7,121,004 B1 | 10/2006 | Shoup |

(Continued)

FOREIGN PATENT DOCUMENTS

| | | | | |
|---|---|---|---|---|
| CN | 101498193 B | 8/2009 | | |
| CN | 106384414 A | 2/2017 | | |
| CN | 106384414 B | * 7/2018 | ............... | E06B 7/28 |

*Primary Examiner* — Rowina J Cattungal

(57) ABSTRACT

A high security two-way virtual cross-barrier observation and communication device has a mounting frame with a hardened core, a pair of digital displays, and a pair of cameras. The mounting frame may correspond to a typical interior door of a building or a relevant component of a vehicle, aircraft, or other relevant application. The hardened core is bullet-resistant and fire-resistant to protect occupants of a protected space from harm. The digital displays and cameras are positioned on opposing sides of the mounting frame, each camera transmitting a live video feed to the opposing display, creating the appearance of a window while protecting occupants. The digital displays may be used to display any desired information. An emergency protocol may be activated to communicate with emergency services. A plurality of laminate layers bond and encapsulate the displays and cameras to the hardened core, forming a rugged, self-contained unit with no moving parts.

18 Claims, 6 Drawing Sheets

Related U.S. Application Data

(60) Provisional application No. 62/822,504, filed on Mar. 22, 2019.

(51) Int. Cl.

| | | |
|---|---|---|
| *E06B 1/14* | (2006.01) | |
| *E06B 1/18* | (2006.01) | |
| *E06B 1/52* | (2006.01) | |
| *F41H 13/00* | (2006.01) | |
| *G03B 15/02* | (2021.01) | |
| *G08B 13/14* | (2006.01) | |

(56) References Cited

U.S. PATENT DOCUMENTS

| | | |
|---|---|---|
| 9,683,391 B2 | 6/2017 | Johnson |
| 2005/0285934 A1* | 12/2005 | Carter .................. H04N 7/147 |
| | | 348/14.06 |
| 2014/0101575 A1* | 4/2014 | Kwak .................. G06F 3/0486 |
| | | 715/761 |
| 2015/0096479 A1* | 4/2015 | McCarthy ................ A47F 9/00 |
| | | 89/36.02 |
| 2016/0266577 A1* | 9/2016 | Kerzner ................ G08B 19/00 |
| 2019/0108405 A1* | 4/2019 | Xu ...................... G08B 27/003 |
| 2019/0295207 A1 | 9/2019 | Day |

\* cited by examiner

HIGH SECURITY TWO-WAY VIRTUAL CROSS-BARRIER OBSERVATION AND COMMUNICATION DEVICE

The current application is a continuation-in-part (CIP) application of a U.S. non-provisional application Ser. No. 16/827,703 filed on Mar. 24, 2020. The U.S. non-provisional application Ser. No. 16/827,703 claims a priority to a U.S. provisional application Ser. No. 62/822,504 filed on Mar. 22, 2019.

FIELD OF THE INVENTION

The present invention relates generally to security windows mounted in doors and barriers. More specifically, the present invention is a dual view virtual high security window that is intrusion, fire, bullet, and blast resistant.

BACKGROUND OF THE INVENTION

School shootings have unfortunately become more common and more deadly in recent years. If an assailant breaches the front entry of a school, the classroom door is the last line of defense for the students in the classroom, and few teachers are equipped to defend and protect students in such a scenario. It is therefore an objective of the present invention to address this issue by providing users with a full-size virtual "window" created by a pair of opposing cameras streaming live video feeds to digital displays mounted opposite each other in a frame such as an interior door that offers positive security against unwanted or illegal forced entry into a classroom, office or the like. It is also an objective of the present invention to provide an information dissemination platform through remote electronic control of any messages or other digital content to be displayed on the digital displays.

It is a further objective of the present invention to provide to provide a high-security door or other barrier constructed to withstand fire and bullet impacts, and whose constituent components are further laminated and encapsulated together with high performance laminate material, providing durability and enabling functionality in a wide variety of challenging environments.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
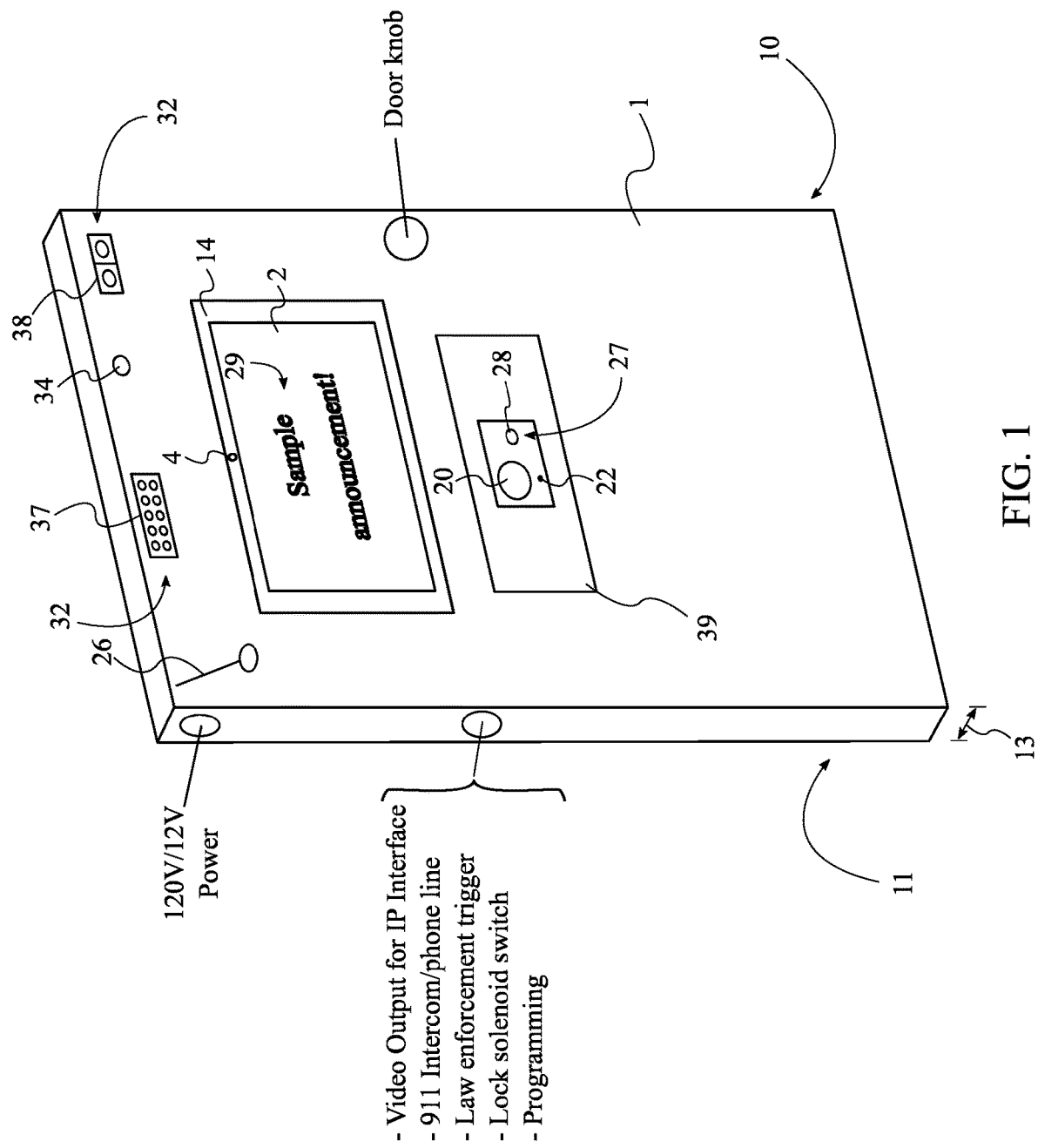
FIG. 1 is a perspective view of a protected side of the present invention according to some embodiments.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a high security two-way virtual cross-barrier observation and communication device. More particularly, the present invention provides a sturdy protective barrier resistant against fire and firearms with a virtual "window" enabling real-time observation through the protective barrier. In general, the present invention is intended for installation into or initial construction with interior doors for use in various settings such as, but not limited to, schools, offices, or homes, where it is desirable to provide protection of the occupants of a room or other protected space from various threats, including, but not limited to, intrusion by one or more assailants, bullet damage from small arms up to armor-piercing rifle rounds, and fire. The present invention may be installed into an existing barrier such as a door or be integrated into the barrier during initial manufacture of the barrier. In addition to physical protection, the present invention provides full observation of the exterior of the protected area, or unprotected area, from the interior of the protected area. The present invention is generally and primarily aimed toward the goal of creating a typical full size "window" in the doors of school classrooms, while providing protection from intrusion, fire, and bullets. It should be noted, however, that the present invention is not restricted to installation in interior doors of buildings and may be adapted for use in any other relevant application, such as, but not limited to, armored vehicles, aircraft, watercraft, or any other application where window-like functionality and message display capabilities coupled with physical protection may be desired. Furthermore, the present invention provides various relevant secondary functionalities such as, but not limited to, mass communication throughout a facility such as a school by displaying a message on each instance of the virtual "window", emergency alert activation, communication with emergency response services, deploying deterrent measures against would-be assailants, and other functionalities and features.

Figure 2:
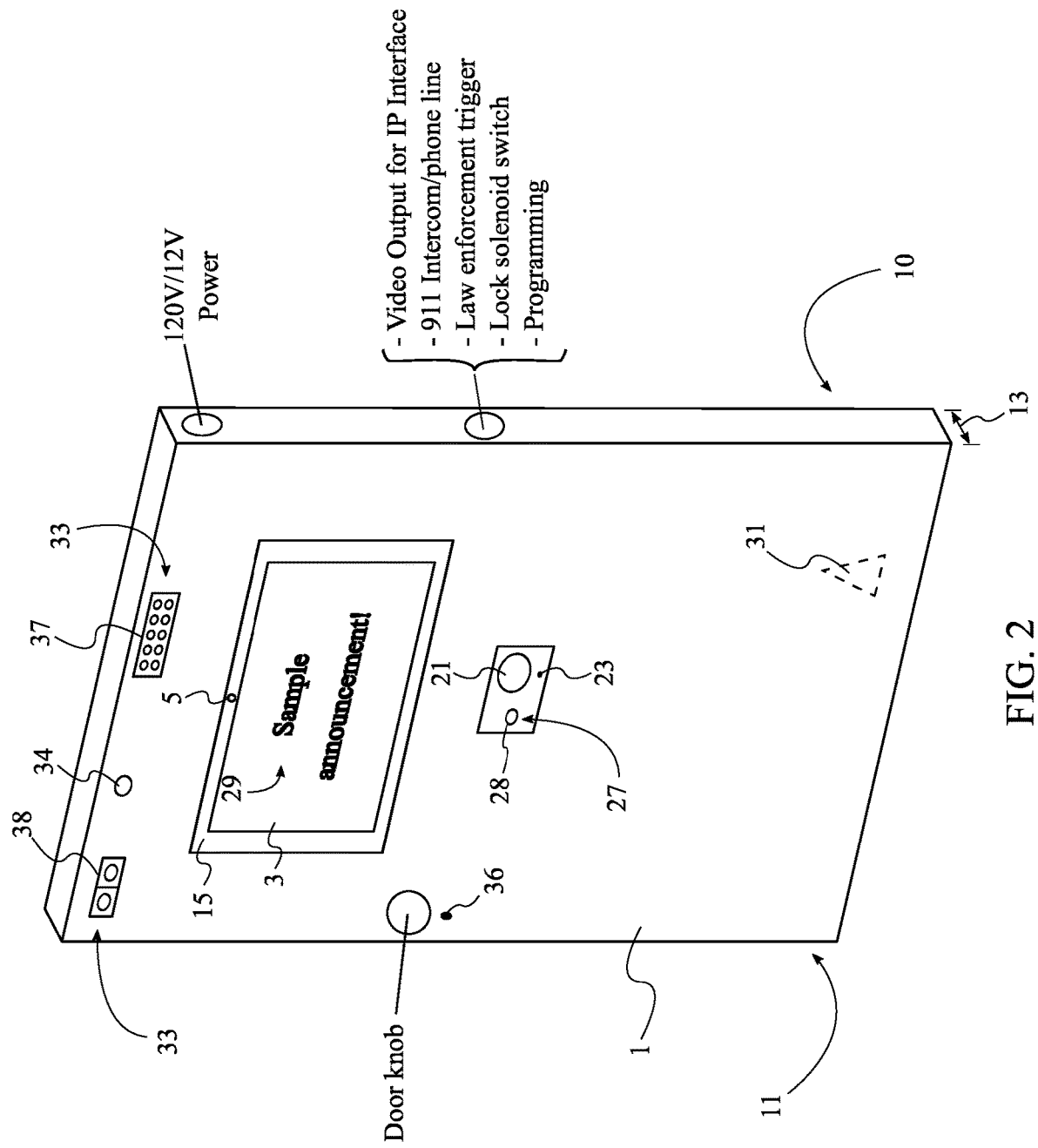
FIG. 2 is a perspective view of an unprotected side of the present invention according to some embodiments.
Figure 3:
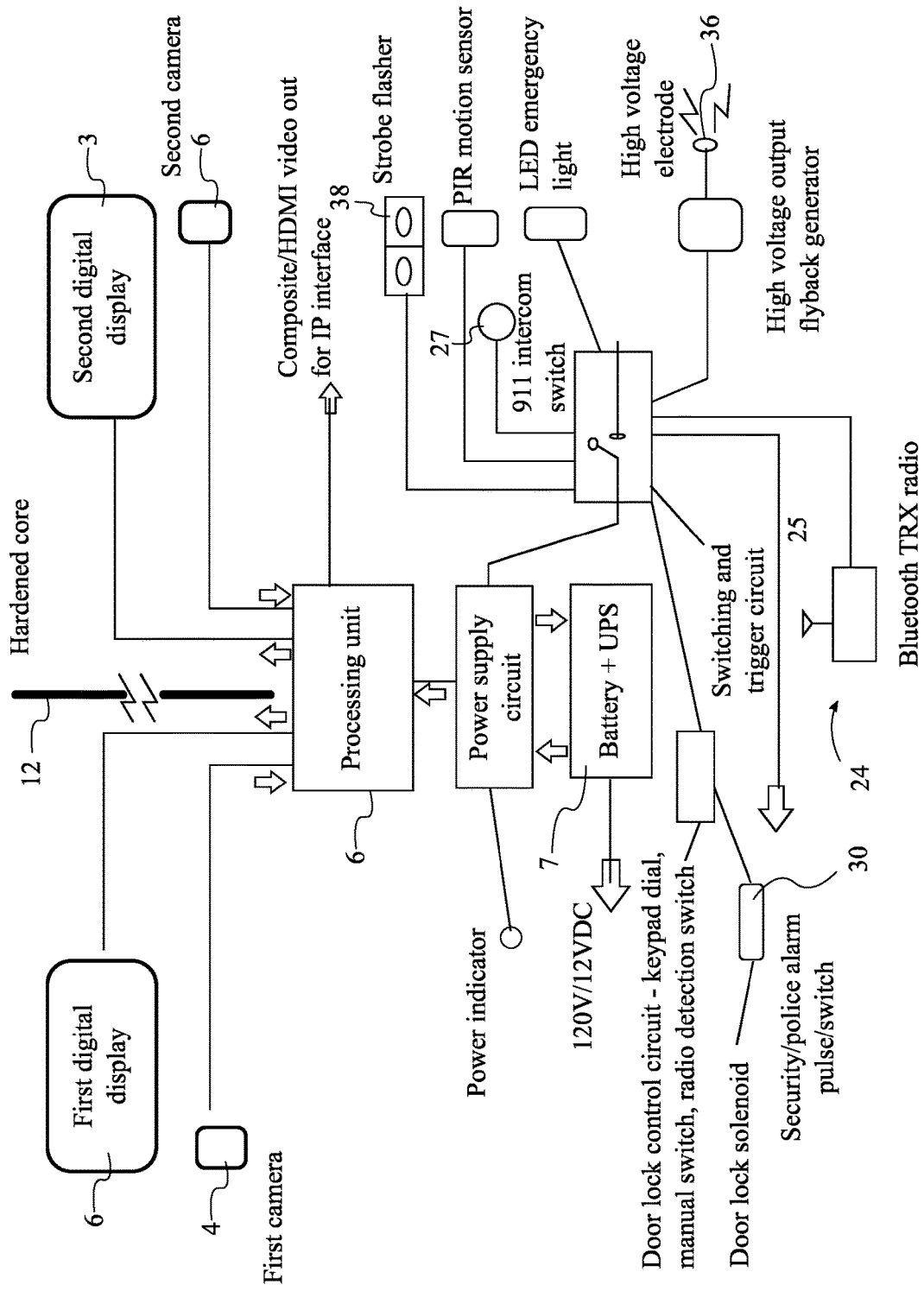
FIG. 3 is a general block diagram of the electrical and electronic components of the present invention according to some embodiments.

In general, referring to FIGS. 1-3, the present invention comprises a mounting frame 1, a first digital display 2, a second digital display 3, a first camera 4, a second camera 5, a processing unit 6, a power source 7, and a plurality of laminate layers 40.

The mounting frame 1 is the main structural component of the present invention that forms the support structure necessary to assemble the remaining components of the present invention together. In some embodiments, the mounting frame 1 is configured to correspond to a standard thickness interior door. In such embodiments, when fully assembled, the thickness of the present invention should not exceed 1¾ inches, in order to fit flush with any standard steel or wood commercial door and for retrofitting existing doors. In some such embodiments, the mounting frame 1 may generally be a typical solid core wood door of any desired dimensions, or be composed of any suitable and/or typical door material. In some alternate embodiments, the present invention may be adapted for use in a vehicle such as, but not limited to, an armored transport vehicle. In such embodiments, the mounting frame 1 may be configured to correspond to a vehicular window frame, a vehicular side panel, a vehicular door, or a vehicular chassis, or any similar or relevant structural component in a vehicle. In the preferred embodiment of the present invention, the mounting frame 1 comprises a protected side 10, an unprotected side 11, and a hardened core 12. The mounting frame 1 extends longitudinally along a thickness 13 of the mounting frame 1 between the protected side 10 and the unprotected side 11, wherein the protected side 10 and the unprotected side 11 are positioned opposite each other on the mounting frame 1. The protected side 10 should be understood herein to be positioned adjacent to the interior of a classroom, office, or other space to be protected through the present invention, while the unprotected side 11 is positioned adjacent to a hallway or other space exterior to the protected space from which as assailant may approach. In some embodiments configured for interior doorways, the thickness 13 of the mounting frame 1 is 1.75 inches to correspond to a typical interior door thickness, though in other embodiments, the thickness 13 of the mounting frame 1 may vary as desired.

The first digital display 2 and the second digital display 3 may be any suitable type of electronic display screen capable of receiving and displaying electronic information. In some embodiments, the first digital display 2 and the second digital display 3 are touchscreens capable of recognizing capacitive, resistive, surface acoustic wave, or infrared touch input. The first camera 4 and the second camera 5 may each be any suitable type of camera capable of capturing and streaming live video to one of the digital displays in order to facilitate the virtual window functionality. The first digital display 2 and the first camera 4 are positioned adjacent to the protected side 10 of the mounting frame 1, while the second digital display 3 and the second camera 5 are positioned adjacent to the unprotected side 11 of the mounting frame 1. More particularly, in the preferred embodiment, the first camera 4 and the second camera 5 are built into the mounting frame 1 in such a way as to conceal the presence of the first camera 4 and the second camera 5. For example, the first camera 4 and the second camera 5 may be concealed behind glass screens covering the first digital display 2 and the second digital display 3. Furthermore, in the preferred embodiment, the first camera 4 and the second camera 5 are each a full color wide angle camera.

Figure 4:
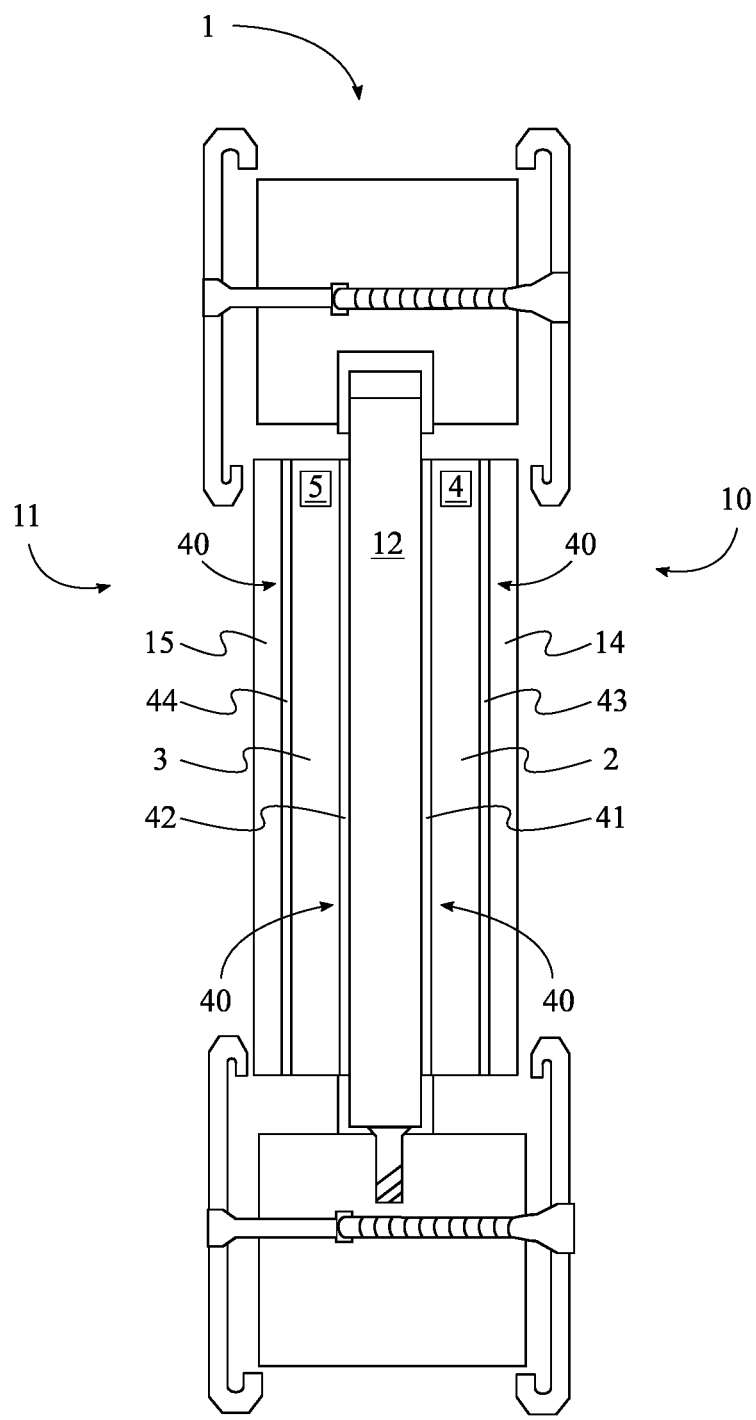
FIG. 4 is a side cross sectional view of the present invention showing the plurality of laminate layers according to some embodiments.

Furthermore, in the preferred embodiment of the present invention, the first digital display 2 and the second digital display 3 are each connected adjacent to the hardened core 12 through one of the plurality of laminate layers 40, as seen in FIG. 4. Moreover, in the preferred embodiment, each of the plurality of laminate layers 40 is a high-performance laminate material, such as, but not limited to, laminate resin. The goal of the inclusion of the plurality of laminate layers 40 is to bond the components of the present invention together in order to achieve a self-contained, unitized apparatus with no moving parts that is sealed with said laminate layers 40 to protect against shock, vibration, moisture, and other potentially harmful effects. The present invention may be fully externally encapsulated by the plurality of laminate layers 40 in some embodiments, or the plurality of laminate layers 40 may internally bond the components of the present invention adjacent to each other. As previously mentioned, the full thickness 13 of the present invention, including any laminate layers 40, should not exceed 1¾ inches in order to fit flush with any standard steel or wood commercial door and retrofitting existing doors.

Preferably, the lamination/encapsulation aspect of the present invention may allow it to withstand, for example, humidity of 95% and extremes of temperature between 165 degrees Fahrenheit and negative 40 degrees Fahrenheit. Further, the present invention may function in weightless conditions, such as in outer space applications, as well as at high pressure conditions, such as deep-sea depths. The present invention may also operate while oriented at any angle, whether vertically as a door embodiment, or horizontally mounted in a floor or ceiling, for example, and will withstand continuous movement or tumbling.

As previously mentioned, in the preferred embodiment of the present invention each of the plurality of laminate layers 40 is composed of a high-performance laminate material. The high-performance laminate material should be optically clear and UV stable, allowing for the cameras to be mounted inside the sealed unit of the present invention, separated from the surrounding environment by fire-resistant surface glass covering the digital displays, as will be described later herein. Further, in the preferred embodiment, the high-performance laminate material conforms to Raytheon missile specs MIS 30366 as well as L3 Harris specs BOMS 8045, Ocean Systems (Advanced) 450% elongation and 3400 PSI. Built to these specifications, the present invention is a rugged, unitized, high-security device suitable for applications in military vehicles, on land, water, aircraft, missiles, or any other relevant application.

The first digital display 2, the second digital display 3, the first camera 4, and the second camera 5 are each electronically connected to the power source 7, as shown in FIG. 3. Furthermore, the first digital display 2, the second digital display 3, the first camera 4, and the second camera 5 are each electronically connected to the processing unit 6, wherein the processing unit 6 is configured in the preferred embodiment to receive a first live video feed from the first camera 4, receive a second live video feed from the second camera 5, display the first live video feed on the second digital display 3, and display the second live video feed on the first digital display 2. Thus, the present invention may enable in some embodiments a two-way observation functionality across the physical barrier presented by the mounting frame 1 and hardened core 12. Students in a classroom, for example, are afforded a similar view to a typical glass window, giving a feeling of openness to the occupants as opposed to a view fully obstructed by a door. Furthermore, facial recognition software may be executed by the processing unit 6 on the first video feed and/or second video feed as desired in various embodiments.

The processing unit 6 is the electronic control and communication processing center of the present invention, comprising one or more computing devices such as, but not limited to, printed circuit boards (PCBs), microcontrollers, integrated circuits, resistors, capacitors, or any other electrical or electronic components suitable for achieving the purpose of the present invention. The processing unit 6 may be a singular processing chip, a motherboard, or any electronic processing component or combination of components suited to carrying out electronic management of the present invention.

The present invention may comprise any number and type of electrical and electronic connections and/or cable terminals for features and components such as the power source 7, video data input/output for IP remote monitoring, intercom audio in/out for phone and radio patching, door lock solenoid, alarm trigger for emergency responders, remote programming, and other functions that can be remotely configured.

It is contemplated that the power source 7 of the present invention may take any form and configuration of electrical power delivery suitable to power all electrical and electronic components of the present invention. The power source 7 may be realized through a hard-wired connection to an external power grid of a building, and/or the power source 7 may comprise a battery backup and/or a remote universal power supply (UPS) for operation during any potential power failure. A UPS may be installed near the present invention in order to provide backup power during extended times of power failure. The present invention may further comprise an internal lithium ion battery or another type of battery and charging system as an added power redundancy.

The preferred embodiment may further include control means for the first digital display 2 and the second digital display 3. More particularly, for example, a user of the present invention such as a teacher may be able to disable the second digital display 3 so that any would-be assailants facing the unprotected side 11 of the present invention are prevented from observing the protected space, such as a classroom full of students.

Further still, the first digital display 2 and/or the second digital display 3 may be utilized for mass communication to students in a school, for example, where each classroom door has the present invention installed. An administrative official may designate at least one display message 29 to display on the first digital display 2 and/or the second digital display 3. The at least one display message 29 may be sent by the administrative official to the processing unit 6 of the present invention, which is configured to receive the at least one display message 29 through the wireless communication device 25 (or through a hard-wired connection) and display the at least one display message 29 on the first digital display 2 and/or the second digital display 3. In some embodiments, different display messages 29 may simultaneously be displayed on the first digital display 2 and the second digital display 3. The at least one display message 29 should not be limited to text characters, and may include still images, video, animation, or any other applicable type of visual media. Such a mass communication means may be utilized during normal operation of a school, for example, by displaying daily announcements, class rescheduling or cancellation information, upcoming events, or any other relevant information. Thus, the present invention facilitates robust transfer of information through the first digital display 2 and the second digital display 3, and physical safety and protection from harm for students or other occupants of the protected space.

In the preferred embodiment of the present invention, the hardened core 12 is centrally positioned along the thickness 13 of the mounting frame 1 and securely connected within the mounting frame 1 between the protected side 10 and the unprotected side 11. In all embodiments, the hardened core 12 is constructed of one or more materials with fire resistant and bullet resistant, or anti-ballistic, properties. In some embodiments, the hardened core 12 is constructed of a hardened steel material, such as, but not limited to, AR-500 steel. In other embodiments, the hardened core 12 may be constructed of any other material with suitable bullet resistant and fire resistant properties, such as, but not limited to, expanded aluminum, composite metal foam, titanium, Kevlar, ceramics, fiberglass, polyethylene, polycarbonate, or other suitable materials.

Further, in the preferred embodiment of the present invention, the plurality of laminate layers 40 comprises a first laminate layer 41 and a second laminate layer 42, as seen in FIG. 4. The first digital display 2 is bonded to the hardened core 12 through the first laminate layer 41, wherein the first digital display 2 is layered adjacent to the first laminate layer 41 opposite the hardened core 12. Similarly, the second digital display 3 is bonded to the hardened core 12 through the second laminate layer 42, wherein the second digital display 2 is layered adjacent to the second laminate layer 42 opposite the hardened core. Thus, the first digital display 2 and the second digital display 3 are permanently and strongly bonded to the hardened core 12.

In some embodiments, the hardened core 12 may comprise a plurality of hardened steel layers 16, or more particularly a plurality of AR-500 steel layers in the preferred embodiment. Each of the plurality of hardened steel layers 16 is layered adjacent to each other in series between the first digital display 2 and the second digital display 3.

Figure 5:
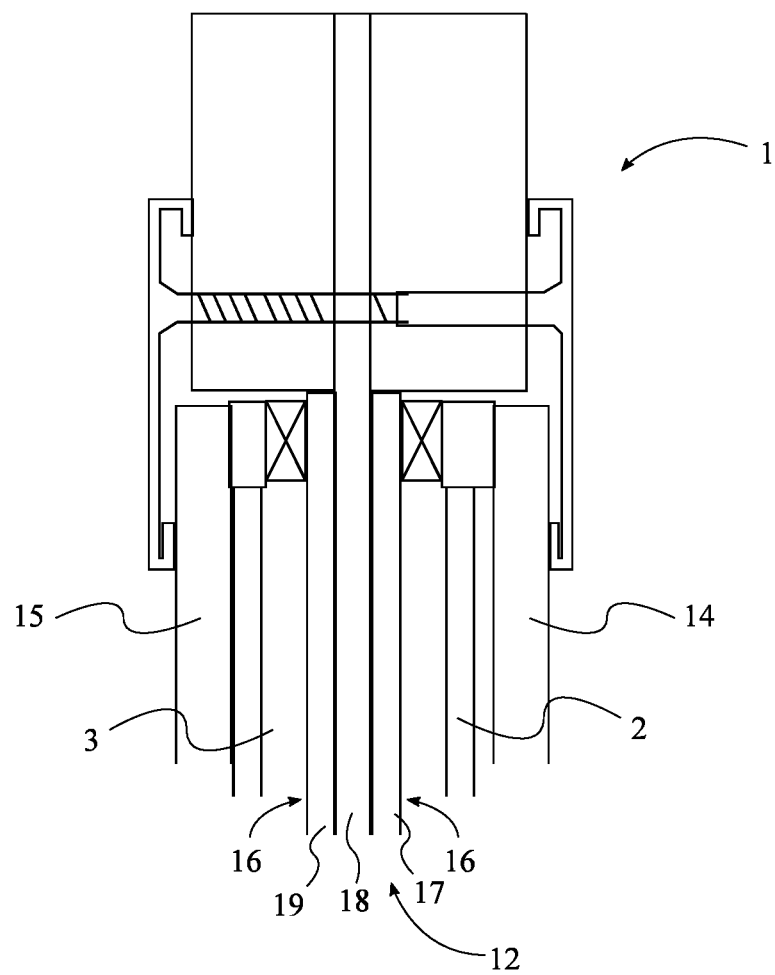
FIG. 5 is a side cross sectional view of the present invention illustrating multiple sections of the hardened core according to some embodiments.

More particularly, in some embodiments of the present invention as shown in FIG. 5, the plurality of hardened steel layers 16 comprises a first hardened steel layer 17, a second hardened steel layer 18, and a third hardened steel layer 19. The first hardened steel layer 17 is positioned between the first digital display 2 and the second hardened steel layer 18. The second hardened steel layer 18 is positioned centrally along the thickness 13 of the mounting frame 1 between the first hardened steel layer 17 and the third hardened steel layer 19. The third hardened steel layer 19 is positioned between the second hardened steel layer 18 and the second digital display 3. In some embodiments, the second hardened steel layer 18 may extend to the lateral boundaries of the mounting frame 1, while the first hardened steel layer 17 and the third hardened steel layer 19 may cover a smaller, more specific area, such as the area occupied by the first digital display 2 and second digital display 3, or may match the coverage area of the second hardened steel layer 18. In some embodiments, each of the plurality of hardened steel layers 16 has a thickness of $3/16$ inches, though the thickness of each of the plurality of hardened steel layers 16 may vary in different embodiments. Moreover, the thickness of the hardened core 12 may vary as desired in various embodiments of the present invention. In some embodiments, the hardened core 12 has a thickness of $1/2"$. In any case, the hardened core 12 should be constructed of a proper material and with a proper thickness to adequately provide ballistic resistance against a range of firearm or bullet classes, from small arms fire to 30-06 armor piercing rounds.

Furthermore, in the preferred embodiment of the present invention, the mounting frame 1 further comprises a first fire-resistant glass layer 14 and a second fire-resistant glass layer 15, while the plurality of laminate layers 40 further comprises a third laminate layer 43 and a fourth laminate layer 44. In some embodiments, the first fire-resistant glass layer 14 and the second fire-resistant glass layer 15 may be constructed of a Keralite ceramic glass material that is a fully code compliant fire protective glass-ceramic material able to resist high temperature and thermal shock.

In the preferred embodiment, the first fire-resistant glass layer 14 is bonded to the first digital display 2 through the third laminate layer 43, wherein the first fire-resistant glass layer 14 is layered adjacent to the third laminate layer 43 opposite the first digital display 2. Similarly, the second fire-resistant glass layer 15 is bonded to the second digital display 3 through the fourth laminate layer 44, wherein the second fire-resistant glass layer 14 is layered adjacent to the fourth laminate layer 44 opposite the second digital display 3.

Thus, the first fire-resistant glass layer 14 and the second fire-resistant glass layer 15 are the outermost layers of the present invention in the preferred embodiment. The first fire-resistant glass layer 14 and the second fire-resistant glass layer 15 are preferably rated to at least 1.5 hours of fire resistance. In an alternate embodiment, the plurality of laminate layers 40 may further comprise an outer shell laminate layer that externally encapsulates the entirety of the present invention, or externally encapsulates the hardened core 12, first digital display 2, second digital display 3, first fire-resistant glass layer 14, and second fire-resistant glass layer 14, as well as the aforementioned first laminate layer 41, second laminate layer 42, third laminate layer 43, and fourth laminate layer 44, and any and all internal electronic components.

The method of application of the plurality of laminate layers 40 may vary. In the preferred embodiment, the plurality of laminate layers 40 is formed by injecting uncured liquid laminate resin between the components to be bonded together. For example, the first laminate layer 41 may be formed by injecting a quantity of uncured liquid laminate resin between the hardened core 12 and the first digital display 2. The assembly is then left alone for a period of time so that the quantity of uncured liquid laminate resin may cure into the first laminate layer 41, bonding and sealing the first digital display 2 and the hardened core 12 together, or the assembly may undergo a particular conditioning treatment to aid in the curing process, if applicable.

It should be further noted that the present invention, being a unitized apparatus capable of plug-and-play operation, has at least one electrical interface or port traversing through the outer shall laminate layer for any necessary electrical wiring, or through any other desired location on the mounting frame of the present invention, in order to permit traversal of the necessary electrical cabling from the interior of the present invention to a location suitable for connecting to an external or pre-existing wiring harness or other such connection means.

Figure 6:
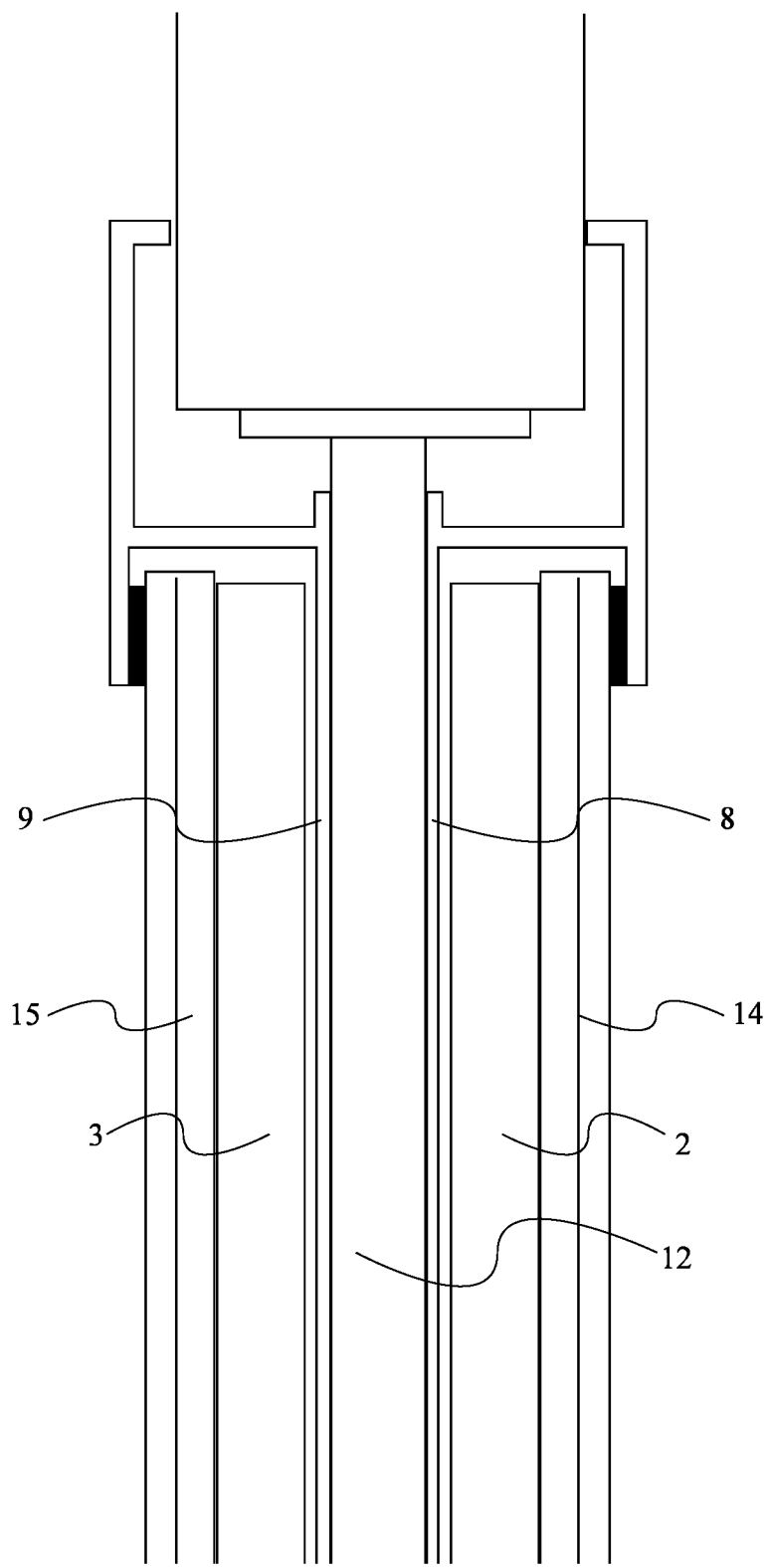
FIG. 6 is a side cross sectional view of the present invention illustrating additional internal buffer sections adjacent to the hardened core according to some embodiments.

In some embodiments, the present invention may further comprise a first internal buffer 8 and a second internal buffer 9, as shown in FIG. 6. The first internal buffer 8 is positioned between the hardened core 12 and the first digital display 2, while the second internal buffer 9 is similarly positioned between the hardened core 12 and the second digital display 3. The first internal buffer 8 and the second internal buffer 9 may provide additional bullet resistance to the present invention by presenting an additional layer of material through which some amount of kinetic energy is dissipated from a traveling bullet after penetrating one of the digital displays and before striking the hardened core 12. In some embodiments, the first internal buffer 8 and the second internal buffer 9 are each $1/16$ inches in thickness along the longitudinal direction between the protected side 10 and the unprotected side 11. In various embodiments, the first internal buffer 8 and the second internal buffer 9 may be constructed of any desirable material, such as, but not limited to, wood, hardened steel, or any anti-ballistic material such as the anti-ballistic materials previously mentioned herein. In some embodiments, the first internal buffer 8 and the second internal buffer 9 may correspond to the first laminate layer 41 and the second laminate layer 42, respectively. In some embodiments, the first internal buffer 8 and the second internal buffer 9 may be included in addition to the plurality of laminate layers 40, requiring two additional laminate layers.

In some embodiments, the present invention may comprise a first speaker 20, a second speaker 21, a first microphone 22, and a second microphone 23. The first speaker 20 and the first microphone 22 are positioned adjacent to the protected side 10; more particularly, they are connected to the protected side 10 in any desirable fashion, such as being integrated into the exterior surface of the mounting surface at the protected side 10. In a similar fashion, the second speaker 21 and the second microphone 23 are positioned adjacent to the unprotected side 11. The first speaker 20, the second speaker 21, the first microphone 22, and the second microphone 23 are electrically connected to the power source 7 and electronically connected to the processing unit 6. The first speaker 20 and the first microphone 22 may form a first intercom unit positioned for use of individuals on the protected side 10 of the present invention, while the second speaker 21 and the second microphone 23 may form a second intercom unit positioned for use of individuals on the unprotected side 11. The first intercom unit and the second intercom unit may be configured to communicate with each other, and/or with any other external entity, such as, but not limited to, emergency services, an administrator's or security guard's office, or other entities.

The preferred embodiment of the present invention further comprises at least one communication device 24; more particularly, at least one electronic communication device. The at least one communication device 24 is electrically connected to the power source 7 and the at least one communication device 24 is electronically connected to the processing unit 6, wherein the at least one communication device 24 is configured to directly communicate with at least one emergency response entity.

More particularly, in some embodiments, the at least one communication device 24 comprises a wireless communication device 25; more particularly, at least one wireless communication device 25. The wireless communication device 25 is electronically connected to the processing unit 6, and the wireless communication device 25 is electrically connected to the power source 7. In various embodiments, the at least one communication device 24 may comprise one or more of various types of wireless communication devices, such as, but not limited to, a wireless networking communication device for electronic communication over a WiFi network, a Bluetooth module for short-range electronic connection with another computing device such as a smartphone, tablet, or remote control for wireless electronic control of the present invention. In some embodiments, a teacher or other use may be able to pair their smart device with the processing unit 6 of the present invention in order to remotely control various functionality of the present invention.

In the preferred embodiment, the at least one communication device 24 comprises a radio frequency (RF) transceiver 26. The RF transceiver 26 is electrically connected to the power source 7 and electronically connected to at least one emergency communication interface 27. The RF transceiver 26 may operate on any suitable bandwidth, such as, but not limited to, very high frequency (VHF), ultra high frequency (UHF), or 800 MHz frequency bands, or other frequency bands.

In the preferred embodiment, the present invention further comprises at least one emergency communication interface 27. The at least one emergency communication interface 27 may be understood to be or include one or more user-interactable elements through which a user such as a teacher may initiate some kind of emergency management process, or predefined emergency protocol, either through direct radio contact with law enforcement or other emergency personnel, or through activation of one or more alarms, sirens, flashing or strobing lights, or similar elements, or the like. The at least one emergency communication interface 27 is electrically connected to the at least one communication device 24, and the at least one emergency communication interface 27 is positioned on the protected side 10. The at least one emergency communication interface 27 is configured in the preferred embodiment to communicate with the at least one emergency response entity through one of the at least one communication device 24 through any desirable means, such as, but not limited to, a two-way radio transceiver, hard-wired telephone line, or any other suitable electronic communication means. Multiple such communication gateways may be utilized in some embodiments for redundancy.

More specifically, in some embodiments, the at least one emergency communication interface 27 comprises an emergency trigger switch 28. The emergency trigger switch 28 is electronically connected to the processing unit 6, wherein the emergency trigger switch 28 is configured to initiate a predefined emergency protocol through the processing unit 6, and the emergency trigger switch 28 is positioned on the protected side 10 of the mounting frame 1. The emergency trigger switch 28 may vary in nature, construction, and specific function in various embodiments. In some embodiments, the emergency trigger switch 28 is a push button. By actuating the emergency trigger switch 28, a user may be able to directly and immediately communicate with entities such as, but not limited to, police, building security, administrators, teachers, or other designated entity or entities. The predefined emergency protocol may also vary in different embodiments. In some embodiments, the predefined emergency protocol may include, but is not limited to, actuation of an emergency communication interface in order to contact an emergency response entity such as police or emergency medical services, initiating recording of either the first live video feed, the second live video feed, or both, activation of at least one light source, actuation of one or more intruder deterrents.

In the preferred embodiment, the present invention further comprises a door locking mechanism 30 and a wireless signal receiver 31. The door locking mechanism 30 is laterally integrated into the mounting frame 1 as is typical with interior doors and configured to be arrested by a strike plate or similar mechanism embedded in the door jamb. Furthermore, the door locking mechanism 30 may be electronically controlled by the present invention, such that a motor is operatively connected to the door locking mechanism 30, wherein the motor is configured to actuate the door locking mechanism 30 between a locked configuration and an unlocked configuration. The wireless signal receiver 31 is electronically connected to the door locking mechanism 30, wherein the wireless signal receiver 31 is configured to receive a wireless unlock signal from an authorized entity and subsequently actuate the door locking mechanism 30 into the unlocked configuration, if the wireless unlock signal is received from the authorized entity. In practical application, various configurations of components may be realized in order to achieve the aforementioned functionality. In some embodiments the wireless signal receiver 31 may be directly connected to the motor, such that receiving the wireless unlock signal through the wireless signal receiver 31 causes a circuit to close which delivers power to the motor in order to unlock the door locking mechanism 30. In some embodiments, the wireless signal receiver 31 is electronically connected to the processing unit 6, which is electronically connected to the door locking mechanism 30. Thus, after receiving the wireless unlock signal, the wireless signal receiver 31 sends the wireless unlock signal to the processing unit 6, and subsequently the processing unit 6 sends an unlock signal to the door locking mechanism 30.

In the preferred embodiment, the present invention comprises at least one first light source 32 and at least one second light source 33. Each of the at least one first light source 32 is connected to the protected side 10, and each of the at least one second light source 33 is connected to the unprotected side 11. Furthermore, each of the at least one first light source 32 and each of the at least one second light source 33 is electrically connected to the power source 7 and electronically connected to the processing unit 6. The at least one first light source 32 and the at least one second light source 33 may comprise the same or different types and/or numbers of light sources in various embodiments. In some embodiments, the at least one first light source 32 and the at least one second light source 33 each comprise an illumination lamp 37 whose primary purpose is to illuminate the field of view of the first camera 4 and the second camera 5, respectively, for optimal viewing conditions through the first digital display 2 and the second digital display 3. In some embodiments, the at least one first light source 32 and the at least one second light source 33 each further comprise an emergency indicator light. In various embodiments, the emergency indicator light may vary. In some embodiments, the emergency indicator light is a red and blue strobe flasher 38. Preferably, the red and blue strobe flasher 38 is activated as part of the aforementioned emergency protocol initiated by a user actuating the emergency trigger switch 28. The red and blue strobe flasher 38 is intended to provide a warning that an intruder is present near a certain area. In some embodiments, the red and blue strobe flasher 38 is only actuated if motion is detected in the unprotected area.

In some embodiments, the present invention further comprises a first motion sensor 34 and a second motion sensor 35. The first motion sensor 34 is positioned adjacent to the protected side 10, wherein the first motion sensor 34 is configured to detect motion in an area adjacent to the protected side 10. The second motion sensor 35 is positioned adjacent to the unprotected side 11, wherein the second motion sensor 35 is configured to detect motion in an area adjacent to the unprotected side 11. The first motion sensor 34 and the second motion sensor 35 are each electrically connected to the power source 7 and electronically connected to the processing unit 6. In the preferred embodiment, the first motion sensor 34 and the second motion sensor 35 are each a passive infrared (PIR) sensor, though in other embodiments, the first motion sensor 34 and the second motion sensor 35 may be realized in any suitable fashion. For example, in some embodiments, a motion detecting software application, algorithm, or other set of computer-executable instructions is executed by the processing unit 6 on the video feeds captured by the cameras in order to detect motion, and distinct motion sensor components are not needed. The first motion sensor 34 and second motion sensor 35 may be configured in some embodiments or situations to activate video recording and activation of at least one light source if an individual is detected passing by or approaching the present invention within a certain selected distance.

In various embodiments, the present invention may comprise various intruder deterrents. One such deterrent comprised in some embodiments of the present invention is a high voltage electrode 36. The high voltage electrode 36 is positioned adjacent to the unprotected side 11 of the mounting frame 1. The high voltage electrode 36 is electrically connected to the power source 7 and electronically connected to the processing unit 6. The high voltage electrode 36 may be actuated by the processing unit 6 if the predefined emergency alert protocol is initiated.

In some embodiments, the present invention may further comprise a storage compartment. The storage compartment may be positioned in some embodiments within the mounting frame 1, between the protected side 10 and the unprotected side 11. An access opening or door may be positioned adjacent to the protected side 10 so that a teacher or other user may access any items stored within the storage compartment. Items stored within the storage compartment may vary, and may include, but are not limited, a two-way radio, a firearm and ammunition, pepper spray, taser, stun gun, knife, handcuffs, flashlight, or other self-defense items or other items.

The following is an alternative, exemplary description of the present invention intended to further illustrate the spirit and scope of the present invention, and is not intended to be limiting.

The present invention is a dual view virtual high security window that is intrusion, bullet, and fire resistant. The present invention uses monitors, a ballistic core, and additional electronic features for installation into doors and barriers.

A 911 emergency button for intercom communications could be integrated for 911 calls to police, school security, admin, teacher, and other designated persons. Such calls may or will be routed through phone lines, two-way radio, or simultaneously through phone lines, 2-way radio, and a police alarm line. An emergency 911 button will serve as a trigger switch for security, police, or to any prescribe user responsible to respond. Once the button is pressed, a person executed the call will be recorded on video, and the door flashing red/blue strobe will flash, the high voltage arcing electrode will start arcing, this will cause a delay to destroy the door lock by the intruder. The call will also activate simultaneously via intercom and 2-way radio so that there will be a redundant route if one gateway fails.

A blue/red strobe light flasher is also integrated to give warning that an intruder is present on a certain door area once the emergency button is activated. Blue and red is the code light for the law enforcer. These flasher lights on both sides of the door will be active once the emergency button is enabled.

One or more motion detectors may be integrated for video recording and light activation if anyone is detected approaching the door within a certain selected distance. The motion detector function may be enabled or disabled at will in some embodiments, and is used to record the moving subject within the selected distance, in addition to being used for power saving and keep the video monitor on hibernate mode when not in use.

A broadband two-way radio and antenna system (VHF/UHF/800 MHz) is used to simulcast the emergency to police, sheriff, security, administrator dispatch, etc. via a 911 call button. The present invention can utilize any existing radio (mobile or handheld) embedded inside and specially wired for 911 dispatch.

A bright LED back up light may be included to light the surface within camera view area during power failure, and can also be used as a regular illumination light during video recording.

A miscellaneous optional compartment may be included to house or mount the following: a.) two-way radio, b.) gun and ammo, c.) pepper spray, d.) taser stun gun, e.) knife, f.) hand cuff flashlight, etc.

Further included may be: auxiliary cables, terminals, a cable for the power source, video data input/output for IP remote monitoring. APPS, intercom audio in/out for phone and radio patching, door lock solenoid, alarm trigger for police department, remote programming, and other functions can be remotely configured.

A remote UPS power supply for power source during power failure may also be included. A UPS power supply can be installed near the door or remote and capable of back up power during extended time of power failure. Also, the door has an internal lithium ion battery and charging system as an added back up power.

A radio detection unlock switch may be included, which will unlock the door at the entrance during emergency via radio signal on transmit. The internal circuit of this device will activate if radio RF signal on transmit is detected. The circuit will activate on VHF/UHF and 800 MHz bands on close proximity. The circuit sensitivity can be adjusted from 1″ to 12″. The door lock solenoid will open as long as the handheld radio is transmitting near the designated points of the RF device. This is another option for the responders (police, security, medics, etc.) to open the door quick. Must be restricted to authorized person only access.

A Bluetooth transceiver may also be added for whatever purpose it may serve. For example, to serve as an emergency door opening override.

The present invention is based on a with a standard full view 180-degree vision window. The present invention can be a complete unit for new construction, or a retro-fit unit for existing doors. The present invention can be fully contained within the standard door thickness. The present invention can be on or two way. The internal security core can be steel, fiberglass, ceramic, or alum composite as determined by weight requirements. If the building exterior is breached, the present invention becomes the last line of defense. While there are several choices for the core material, the present invention focuses on the CMF, aluminum foam, as it provides high performance and reduced weight. Power for the present invention is low voltage DC. Special inside (protected side), contains the access to the control panel. Electronic components are contained in this security storage area with room for a defensive weapon if desired, and first aid kit. This substitutes for weapon storage. Teacher is not required to carry a gun.

The present invention provides openness, safety, and comfort of a standard glass, door vision window, while protecting against intrusion, bullets, and fire. The present invention is a safety barrier. The present invention can alert the school administration, the school security guard. The present invention can call the police immediately, locates and identifies the specific classroom with a flashing alert signal light and alarm. The present invention allows for voice communication within the room and the hallway. The present invention has battery back up in the event of power failure. The present invention will help the teacher protect students, without the necessity of carrying a weapon. The present invention will provide fire, intrusion, and protection against ballistic attack, up to and including, high powered rifle, 30.06, AR-15, and armor piercing ammunition.

Security admin can open the door via switch lock/unlock feature. A number dial pad can also open and access the door by dialing a secret combination number. A special designed RF detection system switch that would open the door when radio transceiver is located on transmit in close proximity of the designated sensor inside the door. Example a sticker or reflector in any portion of the door indicates the RF switch override.

The present invention can also be used in lieu of typical glass window in vehicles.

Although the invention has been explained in relation to its preferred embodiment, it is to be understood that many other possible modifications and variations can be made without departing from the spirit and scope of the invention as hereinafter claimed.

What is claimed is:

1. A high security two-way virtual cross-barrier observation and communication device comprising:
    a mounting frame;
    a first digital display;
    a second digital display;
    a first camera;
    a second camera;
    a processing unit;
    a power source;
    a plurality of laminate layers;
    a door locking mechanism;
    a wireless signal receiver;
    a high voltage electrode;
    the mounting frame comprising a protected side, an unprotected side, and a hardened core, wherein the mounting frame extends longitudinally along a thickness of the mounting frame between the protected side and the unprotected side, wherein the protected side and the unprotected side are positioned opposite each other on the mounting frame, and wherein the hardened core is constructed of a bullet resistant and fire resistant material;
    the hardened core being connected within the mounting frame between the protected side and the unprotected side;
    the first digital display and the first camera being positioned adjacent to the protected side of the mounting frame;
    the second digital display and the second camera being positioned adjacent to the unprotected side of the mounting frame;
    the first digital display and the second digital display each being connected adjacent to the hardened core through one of the plurality of laminate layers;
    the first digital display, the second digital display, the first camera, and the second camera being electrically connected to the power source;
    the first digital display, the second digital display, the first camera, and the second camera being electronically connected to the processing unit, wherein the processing unit is configured to receive a first live video feed from the first camera, receive a second live video feed from the second camera, display the first live video feed on the second digital display, and display the second live video feed on the first digital display;
    the door locking mechanism being laterally integrated into the mounting frame;
    the wireless signal receiver being electronically connected to the door locking mechanism, wherein the wireless signal receiver is configured to receive a wireless unlock signal from an authorized entity and subsequently actuate the door locking mechanism into an unlocked configuration, if the wireless unlock signal is received from an authorized entity;
    the high voltage electrode being positioned adjacent to the unprotected side of the mounting frame;
    the high voltage electrode being electrically connected to the power source; and
    the high voltage electrode being electronically connected to the processing unit, wherein the processing unit is configured to actuate the high voltage electrode if a predefined emergency alert protocol is initiated.

2. The high security two-way virtual cross-barrier observation and communication device as claimed in claim 1, wherein the hardened core is constructed of a hardened steel material.

3. The high security two-way virtual cross-barrier observation and communication device as claimed in claim 1, wherein the mounting frame is configured to correspond to a standard thickness interior door.

4. The high security two-way virtual cross-barrier observation and communication device as claimed in claim 1, wherein the thickness of the mounting frame does not exceed 1.75 inches.

5. The high security two-way virtual cross-barrier observation and communication device as claimed in claim 1, wherein the mounting frame is configured to correspond to a vehicular window frame.

6. The high security two-way virtual cross-barrier observation and communication device as claimed in claim 1 comprising:
    the plurality of laminate layers comprising a first laminate layer and a second laminate layer;
    the first digital display being bonded to the hardened core through the first laminate layer, wherein the first digital display is layered adjacent to the first laminate layer opposite the hardened core; and
    the second digital display being bonded to the hardened core through the second laminate layer, wherein the second digital display is layered adjacent to the second laminate layer opposite the hardened core.

7. The high security two-way virtual cross-barrier observation and communication device as claimed in claim 1 comprising:
    the hardened core comprising a plurality of hardened steel layers; and
    each of the plurality of hardened steel layers being layered adjacent to each other in series between the first digital display and the second digital display.

8. The high security two-way virtual cross-barrier observation and communication device as claimed in claim 7 comprising:
    the plurality of hardened steel layers comprising a first hardened steel layer, a second hardened steel layer, and a third hardened steel layer;
    the first hardened steel layer being positioned between the first digital display and the second hardened steel layer;
    the second hardened steel layer being positioned between the first hardened steel layer and the third hardened steel layer; and
    the third hardened steel layer being positioned between the second hardened steel layer and the second digital display.

9. The high security two-way virtual cross-barrier observation and communication device as claimed in claim 1 comprising:
 the mounting frame further comprising a first fire-resistant glass layer and a second fire-resistant glass layer;
 the plurality of laminate layers comprising a third laminate layer and a fourth laminate layer;
 the first fire-resistant glass layer being bonded to the first digital display through the third laminate layer, wherein the first fire-resistant glass layer is layered adjacent to the third laminate layer opposite the first digital display; and
 the second fire-resistant glass layer being bonded to the second digital display through the fourth laminate layer, wherein the second fire-resistant glass layer is layered adjacent to the fourth laminate layer opposite the second digital display.

10. The high security two-way virtual cross-barrier observation and communication device as claimed in claim 1 comprising:
 a first speaker;
 a second speaker;
 a first microphone;
 a second microphone;
 the first speaker and the first microphone being positioned adjacent to the protected side;
 the second speaker and the second microphone being positioned adjacent to the unprotected side;
 the first speaker, the second speaker, the first microphone, and the second microphone being electrically connected to the power source; and
 the first speaker, the second speaker, the first microphone, and the second microphone being electronically connected to the processing unit.

11. The high security two-way virtual cross-barrier observation and communication device as claimed in claim 1 comprising:
 at least one communication device;
 the at least one communication device being electrically connected to the power source; and
 the at least one communication device being electronically connected to the processing unit, wherein the at least one communication device is configured to directly communicate with at least one emergency response entity.

12. The high security two-way virtual cross-barrier observation and communication device as claimed in claim 11 comprising:
 the at least one communication device comprising a wireless communication device;
 the wireless communication device being electronically connected to the processing unit; and
 the wireless communication device being electrically connected to the power source.

13. The high security two-way virtual cross-barrier observation and communication device as claimed in claim 11 comprising:
 at least one emergency communication interface;
 the at least one emergency communication interface being electrically connected to the at least one communication device;
 the at least one emergency communication interface being positioned on the protected side; and
 the at least one emergency communication interface being configured to communicate with the at least one emergency response entity through the at least one communication device.

14. The high security two-way virtual cross-barrier observation and communication device as claimed in claim 12, wherein the processing unit is configured to receive at least one display message through the wireless communication device and display the at least one display message on the first digital display and the second digital display.

15. The high security two-way virtual cross-barrier observation and communication device as claimed in claim 11 comprising:
 the at least one communication device comprising a radio frequency (RF) transceiver;
 the RF transceiver being electrically connected to the power source; and
 the RF transceiver being electronically connected to at least one emergency communication interface.

16. The high security two-way virtual cross-barrier observation and communication device as claimed in claim 13 comprising:
 the at least one emergency communication interface comprising an emergency trigger switch;
 the emergency trigger switch being electronically connected to the processing unit, wherein the emergency trigger switch is configured to initiate a predefined emergency protocol through the processing unit, and
 the emergency trigger switch being positioned on the protected side of the mounting frame.

17. The high security two-way virtual cross-barrier observation and communication device as claimed in claim 1 comprising:
 at least one first light source;
 at least one second light source;
 each of the at least one first light source being connected to the protected side;
 each of the at least one second light source being connected to the unprotected side; and
 each of the at least one first light source and each of the at least one second light source being electrically connected to the power source and electronically connected to the processing unit.

18. The high security two-way virtual cross-barrier observation and communication device as claimed in claim 1 comprising:
 a first motion sensor;
 a second motion sensor;
 the first motion sensor being positioned adjacent to the protected side, wherein the first motion sensor is configured to detect motion in an area adjacent to the protected side;
 the second motion sensor being positioned adjacent to the unprotected side, wherein the second motion sensor is configured to detect motion in an area adjacent to the unprotected side; and
 the first motion sensor and the second motion sensor being electrically connected to the power source and electronically connected to the processing unit.

\* \* \* \* \*